United States Patent [19]

Brown

[11] 4,050,915
[45] Sept. 27, 1977

[54] FERRULE AND USE THEREOF FOR COOLING A MELT SPUN HOLLOW GLASS FIBER AS IT EMERGES FROM A SPINNERETTE

[75] Inventor: William E. Brown, Walnut Creek, Calif.

[73] Assignee: The Dow Chemical Company, Midland, Mich.

[21] Appl. No.: 729,440

[22] Filed: Oct. 4, 1976

[51] Int. Cl.² .............................................. C03B 37/02
[52] U.S. Cl. ................................................. 65/1; 65/2; 65/11 W; 65/12; 65/355; 264/89.95; 425/DIG. 217
[58] Field of Search ................. 65/1, 2, 11 W, 12, 355, 65/30 R; 425/DIG. 217; 264/89, 94, 95

[56] References Cited
U.S. PATENT DOCUMENTS

| | | | |
|---|---|---|---|
| 2,269,459 | 1/1942 | Kleist | 65/86 X |
| 3,103,718 | 9/1963 | Lindemann | 65/86 X |
| 3,268,313 | 8/1966 | Burgman et al. | 65/2 X |
| 3,440,685 | 4/1969 | Constantakis et al. | 65/12 X |
| 3,540,870 | 11/1970 | Pei | 65/12 X |
| 3,697,241 | 10/1972 | Strickland et al. | 65/2 |
| 3,829,331 | 8/1974 | Tsang | 65/30 R X |

Primary Examiner—Robert L. Lindsay, Jr.
Attorney, Agent, or Firm—Robert R. Stringham

[57] ABSTRACT

An improvement in the process of melt spinning thin walled, hollow fibers from relatively low melting glasses results if cooling of the emerging fiber is accomplished by use of a thin layer of gas to transfer heat from the fiber to a ferrule which fits closely to the spinnerette face and the individual fiber. The ferrule incorporates or is in contact with a heat sink and is slotted or segmented so that it may be brought into position around the moving fiber. Thinner walled, more uniform fibers may be spun when this method of cooling is employed.

13 Claims, 2 Drawing Figures

FIG_1

FIG_2

FERRULE AND USE THEREOF FOR COOLING A MELT SPUN HOLLOW GLASS FIBER AS IT EMERGES FROM A SPINNERETTE

BACKGROUND OF THE INVENTION

The present invention was made in the course of U.S. Government Research Contracts ARPA Contract No. DAHC-15-73-C-0254 and NASA Contract No. NAS 18525.

U.S. Pat. No. 3,268,313 discloses a method of melt spinning hollow glass fibers wherein a stream of molten glass is attenuated and cooled after flowing through an annular orifice, around a co-axial needle through which a stream of gas is introduced. This patent teaches that suitable hollow fibers (for use as reinforcing filament windings in a variety of composite structures) are obtained if the needle tip extends from 0.030 to 0.066 inches (0.762 to 1.676 mm) beyond the spinnerette face.

Fibers having outer diameters of from 0.0003 to 0.003 inches (~7.5 to ~75 microns) and having 10 to 65% of their volume hollow are said to be producible by this method. Production of uniform diameter fibers having walls of essentially constant thickness is said to be assured by the concentricity of the spinnerette orifice and gas needle, by controlled gas pressure and by keeping the attenuating force uniform. No cooling effects or methods are disclosed.

The method of the '313 patent is apparently applicable, as disclosed, for making hollow fibers of the preceding dimensions from ordinarg glass without resort to special cooling methods. The melting point of ordinary glass is about 1200° C. and this temperature is high enough so that considerable heat is lost from the emerging fiber by radiation. Simple convective cooling by the ambient atmosphere around the fibers also is effective. However, it has been found that adequacy and uniformity of cooling is more of a problem with lower melting types of glasses.

U.S. Pat. No. 3,829,331 describes a sodium borosilicate glass composition which is suitable for preparation of hollow glass fibers to be utilized as the electrolyte/separator in high temperature sodium/sulfur battery cells (see U.S. Pat. Nos. 3,476,602; 3,765,944; 3,791,868 and 3,917,490). Glasses of this composition are relatively low melting; that is, they melt at about 800° C. Significant amounts of heat are not lost by radiation from a fiber issuing from a spinnerette at a temperature of 800° C. and simple convective cooling is not fast enough and cannot be relied on to provide uniform cooling, which is essential to fiber uniformity.

Fast, uniform cooling is particularly essential to the production of thin-walled fibers, such as are required (to minimize internal resistance and maximize volumetric efficiency) for hollow fibers which are to be used in sodium/sulfur batteries. As the nascent fiber undergoes the transition from a fluid to a non-fluid state, it is acted on by the prevailing surface tension and attenuation forces. Both of the latter forces tend to reduce the fiber diameter but their effects on wall thickness are opposed. That is, the surface tension tends to thicken the wall and the attenuating force tends to make it thinner. The gas pressure prevailing within the portion of the fiber in the transition zone tends to expand the fiber. Since the cross-sectional area remains constant at a given fiber take-up rate (attenuation force), the wall thickness must decrease as the fiber diameter is increased. That is, the fiber I.D. will increase more than the O.D. when a higher gas pressure is applied. However, the pressure can only be increased to an extent which is dependent on the resistance of the most fluid (hottest) portion of the emerging fiber to "blowing out." In order to apply sufficient pressure to obtain wall thickness of about 10 microns or less, it is necessary to increase the viscosity in the glass just below the spinnerette, i.e., to cool the glass more rapidly.

The requisite amount of heat can be removed by directing jets of a gas, such as helium which has a higher heat conductivity than air, at the portion of the fiber just below the spinnerette. However, it is difficult to achieve uniform cooling by this method. Furthermore, it is known (*Glicksman, A Prediction at the Upper Temperature Limit for Glass Fibre Spinning; Glass Technology* Vol. 15, No. 1, February 1974) that oscillatory and shape instability phenomena are associated with the existence of an upper limit on spinning temperatures; these phenomena tend to be aggravated by even slight, transitory fluctuations in cooling gas flow rates and/or patterns.

It is thus apparent that a better method of cooling is essential to production of uniform, thin-walled hollow glass fibers from relatively low melting glasses. Such a method would also be of value for spinning thicker-walled, or even solid, fibers.

OBJECTS OF THE INVENTION

A primary object of the present invention is to provide a method of making hollow glass fibers which are substantially more uniform in diameter and wall thickness and are correspondingly more symmetrical in cross-section.

A particular object is to provide such a method which is applicable to production of thin-walled hollow fibers from relatively low melting glasses.

Another object is to provide an improved method of cooling melt-spun, hollow glass fibers wherein the fluid portion of the forming fiber is not only cooled more rapidly but is is also stabilized against fluctuations in position and shape.

A further object is to effect an improvement in cooling melt spun hollow glass fibers wherein the higher core gas pressures required to form thinner-walled fibers may be employed without correspondingly increasing the risk of "blow outs."

An additional object is to provide a relatively simple but precisely controllable and effective method of cooling melt-spun, hollow glass fibers.

It is also an object of the present invention to provide a method of cooling hollow glass fibers in which the cooling gas acts as a heat transfer medium rather than as a heat sink; that is, a method in which the heat transferred from the fiber to the cooling gas is removed from the hot gas in place, rather than by continually displacing the hot gas with cool gas.

Yet another object is to provide a novel cooling means for accomplishing the preceding objects.

SUMMARY OF THE INVENTION

The present invention is a fiber cooler (a ferrule) and a method of using it.

The drawings are discussed in detail subsequently herein, but are briefly described below.

FIG. 2 depicts the jacket and hinge plate of FIG. 1. The jacket is seen from above as two independently cooled halves 5 from one of which (the lower one on the sheet) an annular cover member 9 has been removed to expose five, milled or routed, trench sections 10 opening into vertical and angled bores (11 and 12, respectively) which connect near the bottom of the jacket half at intersections (13; FIG. 1). Coolant is introduced to and removed from the bores by tubes 14.

The exposed planar surface 15 of the ferrule half in FIG. 1 coincides with a vertical ACA' dividing the hinge plate in FIG. 2. The jacket half 5 which is uppermost (on the page) in FIG. 2 is seen in FIG. 1 as two intersecting vertical sections BC and CB' through FIG. 2.

Neither figure is drawn to an exact scale, but the relative proportions of the ferrule (segment) to the cooling jacket, hinge plate and base plate are essentially correct for a typical embodiment of the invention in which the inner diameter of the cooling jacket (and the ferrule diameter) is about 0.5 inch (12.7 mm).

More specifically, the ferrule of the invention may be defined as:

A ferrule having utility for uniformly cooling an individual, melt spun, hollow glass fiber as it issues from a spinnerette and passes downwardly through the ferrule without making substantial contact therewith, said ferrule having a rigid, heat-conductive body member, an interior wall of which defines a vertical, rectilinear passageway extending completely through said body member and having the general shape of a long-stemmed, conical funnel, every cross-section of said passageway along its axis being generally circular in shape, said body member being cleft by a vertical slot or divided by generally vertical cuts into segments, so that it can be emplaced adjacent said spinnerette and around the moving fiber in such manner that:
  a. the axes of said passageway and said fiber coincide and the fiber enters the funnel-shaped section of the passageway as it leaves the spinnerette and exits from the terminus of the step-shaped section without making substantial contact with said wall, and
  b. not more than 25 percent of the circumference of any cross-section of said passageway is interrupted by said slot or by spaces between said segments, and
said body member, or each of said segments, being so composed as to have an average heat conductivity at least equal to that of graphite and being adapted to be brought into heat-transfer-effective contact with a heat sink.

Segmented, rather than slotted, ferrules of the invention are preferred. In its simplest form, the invention is embodied in a ferrule segment which, when mated with one or more similar segments, will constitute a segmented ferrule as above defined.

The method of the invention may be defined as:

The method of removing heating from a melt-spun, hollow glass fiber, as it issues from a spinnerette, which comprises 1. providing a ferrule, as above defined, which is in heat-transfer-effective contact with said heat sink, the passageway in said ferrule being of such shape and size that the wall defining it will conform closely to but not make substantial contact with said fiber when the ferrule is positioned so that the fiber enters the mouth of said funnel section of the passageway as it exits the spinnerette, and leaves the stem section of said passageway at said terminus thereof, the axes of the fiber and the passageway coinciding,
2. positioning said ferrule as in (1) above, the space between said fiber and said wall being occupied by a gaseous fluid,
3. conducting said heat from the fiber to the ferrule, by means of said gaseous fluid, and from the ferrule to the heat sink, the thermal conductivity of said fluid, the length of said passageway, the fiber take-up rate and the maximum radial distance between the fiber and said wall being such that the fiber attains a non-fluid state upon or prior to leaving said passageway.

In a preferred form of the ferrule, as above defined, the funnel section of the passageway has the shape of a major frustum of an inverted right, circular cone, the maximum possible angle, alpha ($\alpha$), between two surface elements of said cone is within the range of from about 30° to about 75°, the passageway diameter at the mouth of the funnel section is within the range of from about 1700 to about 10,000 microns; the diameter at the terminus of the stem section of said passageway is within the range of about 50 to about 750 microns, the overall length of the passageway is within the range of from about 12,700 to 25,400 microns and the diameter of the stem section, from said terminus to the juncture with the funnel section, is constant or increases smoothly or in one or more discrete stages.

In the preceding definitions, the phrase "without making substantial contact" means that contact between the fiber and the passageway wall is only such as may result from infrequent, temporary misalignments or curvatures of the fiber, and then only to an extent which does not result in fiber breakage or an intolerable degree of variation in fiber uniformity.

In characterizing the preferred shape of the funnel-shaped section of the passageway (through the ferrule) as a frustum of a cone, reference is made above to an angle (alpha) of from about 30° to 75°. This is the maximum angle which can exist between two elements of the cone (conical surface) from which the frustum may be considered to be derived. It is the angle defined by the lines of intersection between the conical surface and a plane containing the axis of the passageway, said lines being extended until they meet at a point on the axis. If the wall of the funnel section of the passageway is inwardly convex, the lines of intersection between the wall and the plane are inwardly convex, diametrically opposite curves. In this case, the preferred shape is such that the angle of intersection of tangents drawn to the two curves, at their points of maximum inflection, is from about 35+ to about 80°.

In the preceding process definition, the wall which defines the passageway is said to "conform closely" to, but not to make substantial contact with, the fiber. This matter will be discussed in greater detail subsequently, but it can be stated here that the distance between the fiber wall and the passageway wall, throughout the length of the passageway, should be as small as is feasible in order to maximize the efficiency of heat transfer between the fiber and the ferrule.

DETAILED DESCRIPTION

Referring again to the drawings, and to FIG. 1 in particular, a molten glass stream 16 is passed through the cylindrical space between the spinnerette body 2 and a co-axial nedle 17 and issues from the annular orifice defined by the terminus of the spinnerette and the tip of the needle.

Figure 1:
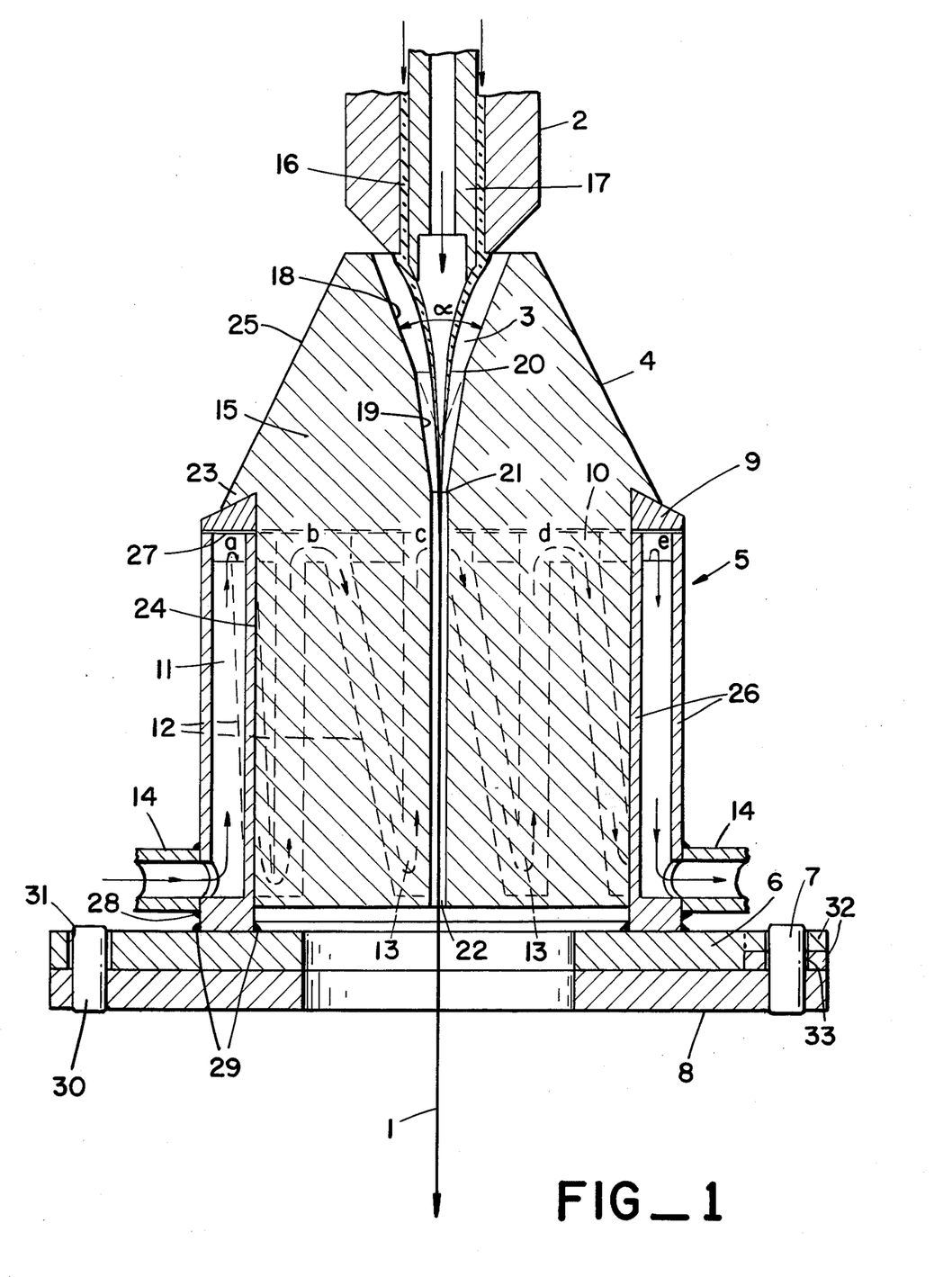
FIG. 1 of the drawings is an elevational view and depicts a hollow glass fiber 1 issuing from a spinnerette 2 and passing through a central passageway 3 in a ferrule (of the present invention) consisting of two segments 4. Heat is transferred by means of an intervening thin layer of gas from the fiber to the ferrule and in turn to a close-fitting, correspondingly segmented, fluid-cooled jacket. Two semi-cylindrical jacket segments 5 are mounted on independently movable halves 6 of an annular hinge plate which are commonly hinged on a pin 7 mounted in an underlying, annular base plate 8.

Although the needle 17 preferably protrudes beyond the spinnerette body, as shown in FIG. 1, this is not essential to the practice of the present invention and the needle end may be flush with the terminus of the spinnerette body.

A core gas, such as air or nitrogen, is passed through the needle under a pressure of from about 3 to about 15 cm of water. The glass exits the orifice as a hollow jet which is rapidly reduced in diameter and cross-section (by flow) as a consequence of the attenuating force exerted on the moving body of glass (the fiber) by a rotating takeup drum (not shown) on which the cooled fiber is spooled. The most fluid portion of the jet, the "bubble" adjacent the spinnerette, tends to expand under the pressure exerted by the core gas. However, this tendency is resisted by surface tension and viscous forces, the latter increasing rapdily as the jet of glass is cooled. The closer the bubble approaches the passageway wall 18 surrounding it, the more rapidly it is cooled. Consequently, the expansion tendency is effectively self-limiting when the bubble is surrounded by closely-fitting ferrule segments 4 of the present invention. Thus, higher gas pressures, essential to making thinner-walled fibers, may be employed at a given spinning temperature, without causing "blow-outs." Also, the stabilizing effect on the bubble walls which results from the high uniformity of cooling provided by the ferrule permits spinning at somewhat higher temperatures and this too facilitates production of thin-walled fibers.

In the embodiment of the invention depicted in FIG. 1, the initial, or "funnel-shaped," section of passageway 3 is defined by a frusto-conical wall surface 18 for which the angle alpha, as defined earlier herein, is about 40°. A second frusto-conical wall surface 19 defines what may be regarded as an uppermost part of the "stem-shaped" section of the passageway. Thus, the circle of intersection 20 between the two frusto-conical wall portions may be regarded as the "juncture" between the funnel and step shaped sections of the passageway. The third portion of the passageway (the lower part of the stem-shaped section) is constant in diameter from its line of intersection (circle; 21) with the second portion, to its terminus 22.

As shown in FIG. 1, the ferrule segment 4 is monolithic; i.e., it is (a segment of) a rigid heat-conductive body member which can be machined from a single, macroscopically homogeneous piece of metal, alloy or other suitable material. Alternatively, however, the present invention may be embodied in ferrules (or ferrule segments) which are functionally equivalent composite structures. Thus, for example, the "body member" may be a relatively thin-walled funnel which is seated in a correspondingly shaped bore through a block of a suitable material. In this case the composite structure is slotted or segmented so it can be appropriately positioned with respect to a spinnerette and fiber depending therefrom.

In the embodiment shown in FIG. 1, a lateral, peripheral portion of the ferrule (segment) 4 is extended to define an annular retaining shoulder or flange 23. The lower surface of the flange meets the (semi) cylindrical surface 24 below the flange at an acute angle, thereby ensuring that the segment 4 will not readily fall out of engagement with the cover member 9 (of the cooling jacket segment 5) on which it is seated, when the cooperating sections of a complete ferrule/jacket assembly are laterally separated.

As shown in FIG. 1, the peripheral surface 25 of the ferrule (segment) above the retaining flange has the shape of a truncated cone, to facilitate raising the complete assembly (after it is "closed" around the fiber) into position adjacent the spinnerette. However, in the absence of interfering structures, the portion of the ferrule (segment) above the flange may be (semi) cylindrical in shape or have any other convenient shape.

The cooling jacket segment (5; FIG. 1 and upper half of FIG. 2) constitutes a convenient type of heat sink. It has the general form of a (semi) cylindrical wall 26 in which are five sequentially connected pairs (a through e) of generaly vertical, cylindrical bores or wells (11 and 12), each pair being sunk from the bottom of a shallow trench 10 in the uppermost surface of the wall and terminating at a level close to the bottom of the wall.

From left to right in both figures, the first bore in each of pairs a through d are vertical, as are both bores of pair e. (Except for the first and last bores, the bores are shown in phantom in FIG. 1.) The second bore in each of pairs a–d is angled to the vertical so that its lower portion intersects the bottom portion of the next bore in sequence. The first and last bores are intersected at their bottoms by coolant inlet and outlet connections (tubes) 14. Flow of the cooling fluid is restricted to the bores, in sequence, by cover member (9; FIG. 1 and upper half of FIG. 2), which is joined to the upper surface of wall 26 in sealing relationship by a suitable cement or solder layer 27. (Alternatively, the cover member may be bolted to the wall top and member 27 may be a gasket). Tubes 14 are joined to the outer surface of wall 26 by anular solder beads 28 and the bottom of the wall is joined to a hinge plate half by a concentric pair of solder bead arcs 29.

Figure 2:
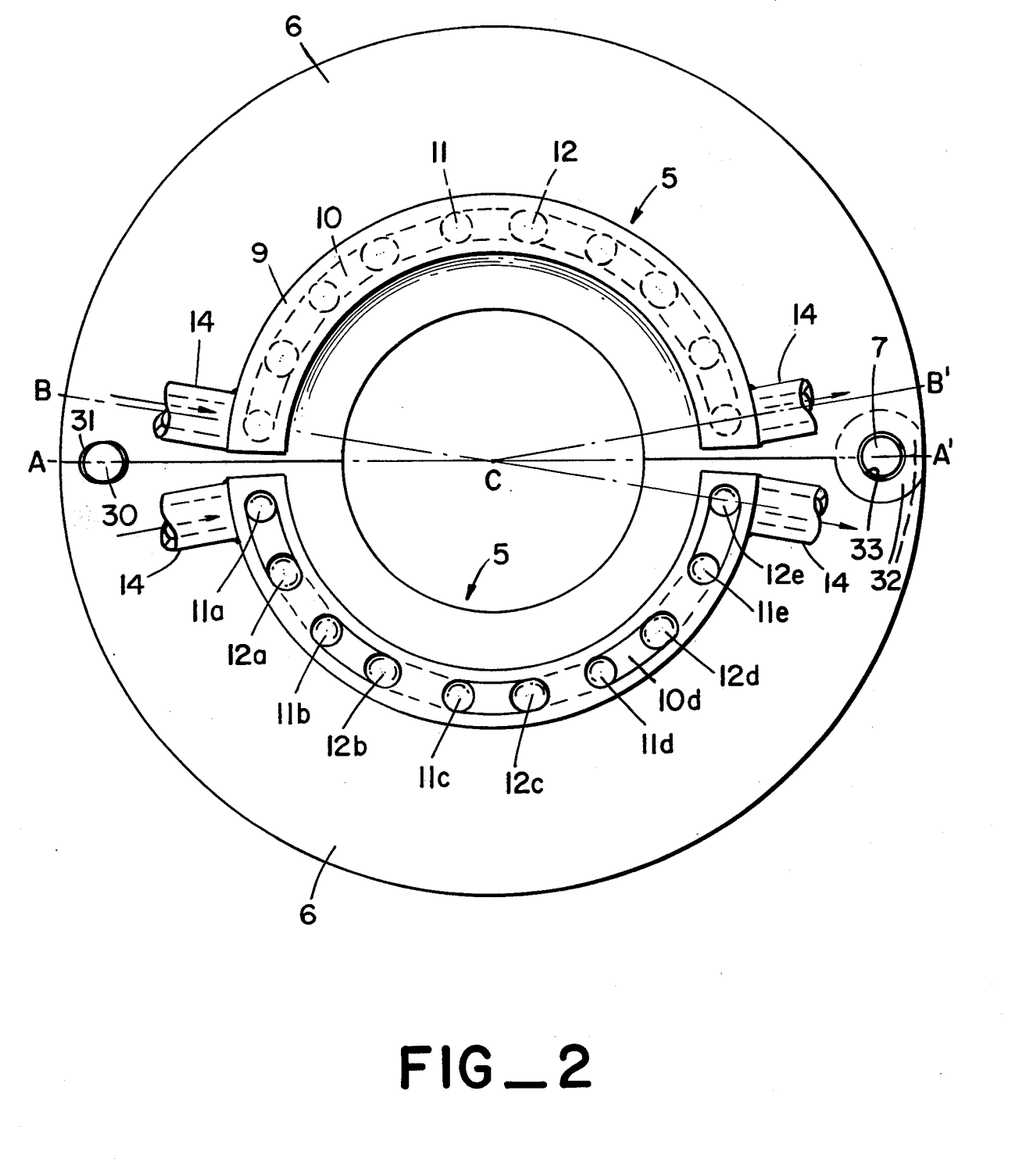

As explained earlier herein, the annular hinge plate consists of two halves 6 which pivot horizontally about hinge pin 7, which is fixed (as by a press fit) in a bore in the underlying base plate (8; not visible in FIG. 2). A stop pin 30 is also anchored in and protrudes from the base plate, both pins being centered on a diameter thereof. Generally semi-circular notches 31 in the opposed vertical surfaces of the hinge plate are so located, sized and shaped that said surfaces can register against each other only when contact between the notch walls and the stop pin is limited to the lines of intersection between those walls and a vertical plane containing the axis of the pin, the diameter on which the pin is centered being perpendicular to said plane. Thus, exact, reproducible positioning of the two ferrule/jacket half-assemblies is assured.

Base plate 8 is not segmented, since the nascent fiber can be started through the relatively large circular opening in the plate without difficulty. A handle (not shown) is attached to one of the hinge plate halves, to facilitate "opening" and "closing" the ferrule/jacket assembly. The base plate is attached by a bracket (not shown) to a suitable, finely-adjustable and lockable jig (also not shown) by means of which the assembly may be moved horizontally and vertically to position it relative to the fiber axis and spinnerette face, respectively.

The hinge plate halves 6 are adapted to commonly hinge on pin 7 by the conventional technique of extending each plate in a semi-circular lobe 32 around the pin opening 33 and milling from opposite faces of the lobes to half-thickness, as shown in FIGS. 1 and 2.

Assembly methods will be apparent to those skilled in the art. However, it is highly preferred to delay segmenting the cooling jacket until after it has been joined to both halves of the hinge plate (tightly "closed" together). That is, the jacket is formed first as a unitary whole, soldered (or otherwise fastened) to the hinge plate (halves), and then cut in half along a diameter between the two sets of coolant connections 14.

It is convenient to refer to the ferrule as being used as a plurality of "segment," but this is not to be construed as limiting the invention to the use of ferrules which have been made as a whole and then cut into two or more pieces. As a practical matter, the reverse practice will generally be followed. That is, the ferrule will be assembled (for use, at least) from two or more mating members which have been individually machined from separate pieces of material. The members ("segments") must mate to form a useable ferrule but do not have to be identical. However, it is particularly convenient to make segments which are mirror image halves, for reasons which will be apparent.

Preferably, the slot in a slotted ferrule, or the slot-shaped openings between "mated" segments of a segmented ferrule, are as small as possible without unduly hindering positioning of the ferrule around the fiber. However, the benefits of the invention may be largely realized even when as much as 25% of the passageway circumference is interrupted by the slot or opening. The segments of a segmented ferrule of course may mate so perfectly than when the ferrule is closed around the fiber, the passageway wall will be essentially continuous around its circumference at all cross-sections along its axis. In this case, the maximum benefit of the invention will be realized.

It will be recognized that arrangements for circulating a cooling fluid through a jacket, other than that illustrated in FIGS. 1 and 2, may be employed. Thus, for example, all of the bores in the jacket wall may be vertical and they may be appropriately joined at their lower ends by the same type of shallow trenches or grooves used (in the design of FIGS. 1 and 2) to join their upper ends. In this case, the hinge plate halves, which are soldered (or otherwise sealingly joined) to the bottom of the jacket wall, function also as do cover members 9 in the design of FIGS. 1 and 2. In another alternative arrangement all of the bores make an angle to the vertical, each bore intersecting the next bore, in alternation, at either its top or bottom. The latter design results in only one (elliptical) opening in each trench (in the top of the wall) for each pair of bores and no bottom trenches are required (as in FIGS. 1 and 2). The bores, if visible in elevation, would be seen in a sawtooth pattern within the wall.

It will also be apparent that the ferule itself may incorporate a heat sink. That is, connected coolant passageways may be provided in each ferrule segment, as by drilling, routing, capping, sealing, etc., or by assembling each ferrule segment as a composite structure in which a relatively thin-walled funnel segment is sealed in place to form the inner wall of a corresponding segment of a generally cylindrical, closed vessel having coolant inlet and outlet connections.

A somewhat less efficient, but much simpler cooling jacket, is simply a spiraled, circular coil of a suitable tubing, such as copper tubing. This type of jacket requires the ferrule segments to be "dropped" into place around a moving fiber passing along the axis of the coil, without disrupting the fiber; a "touch" operation. Accordingly, this type of jacket is much less preferred.

A general procedure for practising the present invention comprises the following steps:

1. providing a spinnerette adapted by means of a core gas needle for (melt) spinning of hollow glass fibers, the outer to inner diameter ratio of the orifice being within the range of from about 0.5 to about 1.3 times the outer to inner diameter ratio of the fiber to be spun and said needle extending from the terminus of the orifice from about 0 to about 0.1 inches (2540 $\mu$);
2. while passing a core gas through said needle under sufficient pressure to prevent capillary rise of glass into the needle, flowing a molten glass vertically downward through said orifice under a pre-selected head and at a pre-selected temperature, thereby establishing a volume flow rate $V_g$ determined by the viscosity of the glass at said temperature;
3. leading the resulting fiber onto a take-up drum of a size and rotating at a pre-selected rate such as to provide a linear take-up rate equal to $V_g/a$, where a is the cross-sectional area of the fiber (solid or hollow) (if the type of supporting and positioning apparatus illustrated in the drawings is used, the initially formed portion of the fiber is "dropped" through the opening in the base plate, en route to the take-up means);
4. positioning a ferrule of the present invention around the moving fiber, adjacent the spinnerette face, so that the fiber enters the passageway through the ferrule as it exits the spinnerette orifice;
5. placing a heat sink in functionally effective contact with the ferrule;
6. collecting the fiber on the take-up drum until an essentially steady state condition has been established in the fluid portion of the fiber;
7. determining the area a and, if necessary, adjusting the glass flow rate or take-up rate, or both, until a is equal to $\pi(d_o^2 - d_i^2)/4$, $d_o$ and $d_i$ being the desired outer and inner fiber diameters respectively;
8. establishing a pre-selected, core gas pressure head of from about 3 to about 15 cm of water;
9. again collecting fiber until an essentially steady state condition has been established in the fluid portion of the fiber; and
10. determining the outer (and inner) diameter of the fiber being produced (as by microscopic examination of an end of a cut fiber length) and, if necessary, adjusting the core gas pressure to obtain the desired wall thickness (since the cross-sectional area has already been established at the desired value, the desired fiber diameters ($d_o$ and $d_i$) will also be obtained).

In order to minimize the likelihood of fiber breakage, particularly during non-steady state phases of the operation, the surface(s) of the ferrule (or segments) which define the fiber passageway may be coated with a layer of a suitable lubricant, such as graphite, up to about 5000 Angstroms thick.

The rate of cooling at any point along the fiber axis depends primarily on how thin the gas layer between the fiber and passageway wall is at that point. That is, the temperature differential between the fiber and the wall will be much larger than the temperature difference between the wall and the heat sink, for two reasons: the ferrule material will have a much higher thermal conductivity than the gas layer and the area of the passageway surface will be quite small relative to the area of contact between the ferrule and the heat sink.

At any point along the fiber portion surrounded by the ferrule, $Q$ — the instantaneous rate of heat transfer from the fiber to the ferrule, expressed in calories per second per cm of fiber length — is related to K, the thermal conductivity of the gas layer [cal/(sec) (cm²) (°C/cm)], and to the $\Delta T$ (°C) across that layer, as follows:

$$Q = 2\pi K \, \Delta T / \ln \frac{D_p}{D_f}, \quad (1)$$

where $D_p$ and $D_f$ are the passageway and fiber (outer) diameters, respectively, at said point.

The surface temperature will not be much higher at the mouth of the passageway than at its terminus; thus, no large error could be introduced by assuming that the surface temperature will be constant at a value a few degrees above the heat sink (incoming coolant) temperature. However, the fiber temperature will decrease quite rapidly as the fiber passes through the funnel-shaped portion of the passageway and progressively less rapidly thereafter. According to Glicksman (loc. cit.), relatively complex relationship between the glass temperature and the distance from the spinnerette can be obtained by solving simultaneous (differential, one-dimensional energy and momentum equations. However, this relationship only holds for the portion of the fiber beyond the point at which the slope (tangential slope) of the bubble surface to the vertical is 1/10 or less. Consequently, neither $\Delta T$ or $Q$ can be determined at each point along the fiber, even though the total amount of heat which must be removed between the mouth and terminus of the passageway is readily calculable (from the required temperature drop, the volume rate of glass flow, the density of the molten glass and its specific heat).

It is evident that the maximum allowable thickness of the gas layer (0.5 ($D_p$-$D_f$)) at any given point along the fiber intermediate of the passageway mouth and terminus cannot be accurately determined from theoretical considerations. However, by making certain assumptions, the maximum average ratio of $D_p$ to $D_f$ in the most critical section (the first centimeter) of the passageway can be estimated closely enough to be useful as a rough guide.

The production of sufficiently thin-walled fibers is much more dependent on the cooling rate in the funnel-shaped section of the passageway than in the stem-shaped section. Consequently, whether or not a given ferrule can be used to make a fiber of a given size and wall thickness will depend primarily on the average rato of $D_p$ to $D_f$ in the funnel-shaped section. This ratio determines the cooling rate just below the spinnerette (which in turn determines the core gas pressure required to attain the specified fiber wall thickness).

Equation (1) can be written in the alternative form:

$$\log_{10}\left(\frac{D_p}{D_f}\right) = \frac{2.728 \times K \times \Delta T_r}{Q} \quad (2)$$

If it is assumed that all of the heat which must be removed to solidify the fiber is taken out in the first centimeter of fiber travel through the passageway, then the instantaneous rate of heat transfer to the ferrule at a point 0.5 cm from the passageway mouth can be taken as the average rate for the first cm. That is $Q = GC \, \Delta T_a$, where G is the glass spinning rate in grams per second; C is the specific heat of the glass in calories per gram per °C and $\Delta T_a$ is the number of degrss the glass temperature must be lowered to render the glass non-fluid. ($\Delta T_r$ in equation (2) is the average temperature difference between the fiber and the passageway wall for the first cm of fiber travel.) The ratio of $D_p$ to $D_f$ calculated be equation (2) may then be taken as an estimate of the maximum permissible average value of the ratio.

For example, the preceding assumtions may be for a glass with a specific heat of 0.25, exiting from a spinnerette at a rate of (0.65/60) grams per second and being cooled from 755° to 555° C. (to render it non-fluid) by radial heat transfer, through a layer of a gas (air) having a conductivity of about 0.0001, to a passageway wall maintained at 25°. The average fiber temperature (in the first cm of its length) will then be 655° C., $\Delta T_r$ will be 630° C. and $\Delta T_a$, the axial temperature drop will be 200° C. The value of log ($D_p$/$D_f$) calculated by substituting the preceding values in equation (2) is found to be 0.317 and the estimated maximum allowable average value of $D_p$/$D_f$ is 2.06 (antilog of 0.317).

If it is assumed that only 90% of the heat is removed ($\Delta t_a = 0.9 \times 200$) in the first cm of fiber travel, the maximum average diameter ratio is estimated as 2.24. If only 80% of the heat is removed, the estimated maximum ratio is 2.48.

Since it is quite difficult to machine passageways less than about 20 mils (508 microns) in diameter, the lowermost (stem-shaped) section of the passageway will usually not be less than about 20 mils in diameter. Thus, when a fiber having a final of O.D. of only about 7.5 microns is being drawn through the ferrule, the $D_p$/$D_f$ ratio will ordinarily be about 68 or more at all points along the stem portion of the passageway.

At the other extreme, the same absolute clearance or gas layer thickness $(508 - 7.5) \div 2 = \sim 250\mu$, can be maintained in the uppermost (funnel shaped) section of the passageway at a much lower $D_p$/$D_f$ ratio. That, is, if the O.D. of the spinnerette orifice is as large as about 6000 microns, $D_p$ at the mouth of the funnel-shaped section of the passageway may be as small as 6500 microns and the $D_p$/$D_f$ ratio will be as low as about 1.1. However, since the bubble is the most critically sensitive portion of the fiber and the heat transfer rate will still be quite adequate at a $D_p$/$D_f$ ratio as high as 2.0, it is a better practice to operate at a diameter ratio (at the funnel mouth) which is from about 1.2 to about 1.3. At an orifice O.D. of 6000 microns, a ratio of 1.3 will provide a clearance (gas layer thickness) of about 900 microns ($\sim$35 mils) between the bubble walls and passageway surface, provided of course that the core gas pressure is not excessive.

Since the portion of the fiber within the ferrule is not visible during the spinning operation, the value of $D_f$ at the mouth of the funnel must be estimated as by assuming it is equal to the O.D. of the spinnerette orifice. Some judgement as to the shape the bubble will tend to assume at a given spinning temperature, core gas pressure and take-up rate can be made by tele-microscopic observation of the bubble while cooling it (at approximately the desired rate) by means such as helium jets.

The gas layer between the fiber and passageway walls may consist simply of ambient air. Some vertical flow of air through the passageway may occur but this is of no significance to the cooling operation. If it is desired to attain a higher K value in the gas layer (to effect more rapid cooling or to permit operating with more clearance between the fiber and passageway walls), a gas having a higher thermal conductivity, such as helium for example, may be used in place of air. This can be cone by causing the gas to flow continuously in the appropriate direction, according to its specific gravity relative to air, through the passageway.

A number of variations in ferrule materials and design, heat sink design, coolants, gas layer composition, procedure, etc., may be made within the scope of the invention and will be made apparent by these specifications to those skilled in the art, even though not specifically disclosed herein. The following examples are illustrative only and are not to be construed as limiting the invention to an extent inconsistent with the claims appended to these specifications.

EXAMPLES

Example 1

An aluminum ferrule 0.75 inch (19 mm) long and 0.5 inch (12.7 mm) in diameter was made up by machining two mirror image halves generally resembling the ferrule-half illustrated in FIG. 1. The passageway consisted of an initial funnel-shaped section having a mouth diameter of 0.16 inch (4060 $\mu$) and narrowing in a 60° angle (alpha, FIG. 1) to a stem-shaped section. The diameter at the juncture of the two sections was 0.04 inch (1000 $\mu$) and a second, abrupt decrease in diameter to 0.03 inch (750 $\mu$) was made at a distance of ¼ inch (6350 $\mu$) from the mouth of the passageway.

A cooling ring, a thin-walled cylinder of brass soldered inside and in close contact with a closely wrapped spiral or ⅛ inch (~3 mm) copper tubing, was positioned about 2 inches below, and in axial alignment with, a platinum spinnerette. The O.D. of the annular orifice in the spinnerette face 0.1 inch (2540 $\mu$), the I.D. was 0.076 inch (1930 $\mu$) and the core gas needle extended 0.038 inch (964 $\mu$) from the spinnerette face (the terminus of the spinnerette wall defining the outer periphery of the orifice). The ratio, $D_p/D_f$, at the mouth of the passageway can be taken as equivalent to the ratio of mouth diameter (4060 $\mu$) to the spinnerette orifice O.D. (2540 $\mu$), or 1.6.

The temperature of the cooling ring during the operation was maintained below 20° by cool water passing through the tubing coil.

A flow of a molten sodium borate glass having the composition $Na_2O.2B_2O_3.0.16NaCl.0.20SiO_2$ was started through the spinnerette, allowed to drop through the cooling ring and led onto a take-up drum. The initial rate of glass flow was about 0.4 grams/minute and the core gas was not turned on; the fiber being formed was solid.

The two ferrule segments were then carefully placed in the cooling ring around the fiber and the assembly was then raised into position adjacent the spinnerette face (as in FIG. 1). The glass flow rate was increased to 0.65 grams/minute and nitrogen gas was supplied to the core gas needle under a pressure equivalent to an 8.6 cm head of kerosene (about 7.74 cm $H_2O$).

A steady state operation was established in which the temperature of the glass feeding the spinnerette was 800°, the temperature of the glass exiting the orifice was 755° and the fiber was taken up on a ⅞ inch diameter (18.1 cm) take-up drum (255 RPM) at a linear rate of 476 feet (145 meters) per minute. A very uniform hollow fiber, 70 microns O.D. × 50 microns I.D. was spun continuously for three hours without size variation or problems of any kind.

Example 2

A run like that of the preceding example was made. When helium was introduced to the passageway at the bottom of the ferrule, the fiber dimensions were altered from 50$\mu$ × 70$\mu$ to 63$\mu$ × 80$\mu$. Correspondingly, the wall thickness decreased from 10 microns to 8.5 microns, indicating that a non-fluid state was reached at a point closer to the spinnerette, as a consequence of more efficient cooling. That is, the length of the transition zone was shortened and less attenuation resulted.

Example 3

The run of Example 1 was repeated, except that the glass flow rate was 0.3 grams/minute, the core gas pressure was equivalent to 9.3 cm of kerosene and the take-up drum was turned at 350 rpm. A 64$\mu$ × 70$\mu$ fiber was spun continuously for 5 hours with no problems. The fiber was of excellent uniformity, despite having a wall thickness of only 3 microns.

Example 4

In a run using a ferrule similar to that described in Example 1, but having an alpha angle of 45° and a 30 mil, constant diameter stem section, a 50$\mu$ × 70$\mu$ fiber was produced. However, the fiber continuity and uniformity was difficult to maintain. The run was stopped and the ferrule passageway surface treated with graphite. The run was then resumed and continued without incident until terminated (after 30 minutes) due to difficulties unrelated to the operability of the process of the invention.

What is claimed is:

1. A ferrule having utility for uniformly cooling an individual, melt-spun, hollow glass fiber, without making substantial contact with the fiber, as it issues from a spinnerette and passes downwardly through the ferrule,
    said ferrule having a rigid, heat-conductive body member, an interior wall of which defines a vertical, rectilinear passageway extending completely through said member and having the general shape of a long-stemmed, conical funnel, every cross-section of said passageway along its axis being generally circular in shape,
    said ferrule being adapted, by generally vertical cuts which form a slot therein or divide the ferrule into mating segments, so that it can be emplaced adjacent to a spinnerette and closely fitted around a moving fiber is issuing therefrom, in a position such that the axes of the fiber and passageway will coincide and the fiber will enter the funnel-shaped portion of said passageway as it leaves the spinnerette and exit from the lower terminus of the stem-shaped section.

the width of said slot or the widths of the spaces between the mated segments being such that not more than 25 percent of any circumference of said passageway is interrupted by said slot or spaces, said ferrule, or each of said segments, being so composed as to have an average heat conductivity at least equal to that of graphite and being adapted to be brought into heat-transfer-effective contact with a heat sink.

2. A ferrule, as defined in claim 1 wherein the funnel section of the passageway has the shape of a major frustum of an inverted right, circular cone; the maximum possible angle, alpha, between two surface elements of said cone is within the range of from about 30° to about 75°; the passageway diameter at the mouth of the funnel section is within the range of from about 1700 to about 10,000 microns, the diameter at the terminus of the stem section of said passageway is within the range of about 50 to about 750 microns, the overall length of the passageway is within the range of from about 12,700 to 25,400 microns and the diameter of the stem section, from said terminus to the juncture with the funnel section, is constant or increases smoothly or in one or more discrete stages.

3. A ferrule segment which when mated with one or more similar segments will constitute a segmented ferrule as defined in claim 1.

4. A ferrule segment which when mated with one or more similar segments will constitute a segmented ferrule as defined in claim 2.

5. A segmented ferrule, as defined in claim 1 which consists of a mirror image pair of half-ferrules.

6. A ferrule as in claim 1 in heat-transfer-effective contact with a fluid-cooled heat sink.

7. A ferrule as in claim 1 wherein the wall of the funnel section of said passageway is inwardly convex and the angle of intersection of tangents drawn to the curved lines of intersection between the wall and a plane including the axis of the passageway, at the points of maximum inflection of said curves, is from about 35° to about 80°.

8. The method of removing heat from a melt-spum hollow glass fiber as it issues from a spinnerette, which comprises 1. providing a ferrule, as defined in claim 1, which is in heat-transfer-effective contact with said heat sink, the passageway in said ferrule being of such shape and size that the wall defining it will conform closely to but not make substantial contact with said fiber when the ferrule is positioned so that the fiber enters the mouth of said funnel section of the passageway as it exits the spinnerette, and leaves the stem section of said passageway at said terminus thereof, the axes of the fiber and the passageway coinciding, 2. positioning said ferrule as in (1) above, the space between said fiber and said wall being occupied by a gaseous fluid, 3. conducting said heat from the fiber to the ferrule, by means of said gaseous fluid, and from the ferrule to the heat sink, the thermal conductivity of said fluid, the length of said passageway, the fiber take-up rate and the maximum radial distance between the fiber and said wall being such that the fiber attains a non-fluid state upon or prior to leaving said passageway.

9. The method of claim 8 in which the ferrule is as defined in claim 2.

10. The method of claim 8 in which the gas constituting said fluid is air.

11. The method of claim 8 in which the gas constituting said fluid is helium.

12. The method of claim 8 in which the walls of the passageway through the ferrule are coated with graphite.

13. The method of claim 8 comprising the following steps:

1. providing a spinnerette adapted by means of a core gas needle for (melt) spinning of hollow glass fibers, the outer to inner diameter ratio of the orifice being within the range of from about 0.5 to about 1.3 times the outer to inner diameter ratio of the fiber to be spun and said needle extending from the terminus of the orifice from about 0 to about 0.1 inches (2540μ);

2. while passing a core gas through said needle under sufficient pressure to prevent capillary rise of glass into the needle, flowing a molten glass vertically downward through said orifice under a pre-selected head and at a pre-selected temperature, thereby establishing a volume flow rate $V_g$ determined by the viscosity of the glass at said temperature;

3. leading the resulting fiber onto a take-up drum of a size and rotating at a pre-selected rate such as to provide a linear take-up rate equal to $V_g/a$, where $a$ is a cross-sectional area of the fiber (solid or hollow);

4. positioning a ferrule of the present invention around the moving fiber, adjacent the spinnerette face, so that the fiber enters the passageway through the ferrule as it exits the spinnerette orifice;

5. placing a heat sink in functionally effective contact with the ferrule;

6. collecting the fiber on the take-up drum until an essentially steady state condition has been established in the fluid portion of the fiber;

7. determining the area $a$ and, if necessary, adjusting the glass flow rate or take-up rate, or both, until $a$ is equal to $\pi(d_o^2 - d_i^2)/4$, $d_o$ and $d_i$ being the desired outer and inner fiber diameters, respectively;

8. establishing a pre-selected, core gas pressure head of from about 3 to about 15 cm of water;

9. again collecting fiber until an essentially steady state condition has been established in the fluid portion of the fiber; and 10. determining the outer and inner diameters of the fiber being produced and, if necessary, adjusting the core gas pressure to obtain the desired wall thickness.

* * * * *

UNITED STATES PATENT OFFICE
CERTIFICATE OF CORRECTION

PATENT NO. : 4,050,915
DATED : September 27, 1977
INVENTOR(S) : William E. Brown It is certified that error appears in the above-identified patent and that said Letters Patent are hereby corrected as shown below:

Col. 1, line 31, spelling of "ordinary";

Col. 3, line 50, spelling of "stem-shaped";

Col. 3, line 66, word should be "heat" instead of "heating";

Col. 4, line 61, "35+" should be "35°";

Col. 5, line 27, spelling of "rapidly";

Col. 5, line 50, "step" should be "stem";

Col. 9, line 27, "could" should be "would";

Col. 10, line 7, spelling of "solidify";

Col. 10, line 22, spelling of "assumptions";

Col. 11, line 44, "or" should be "of";

Col. 12, line 63, "is" should be removed.

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*